Figure 1:
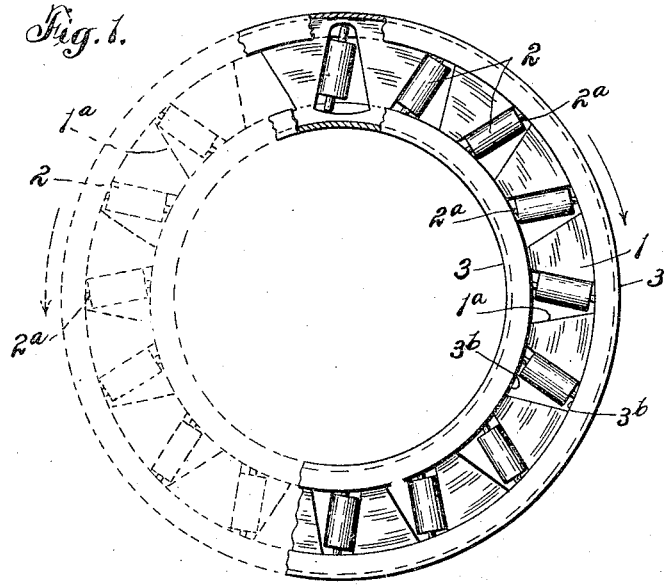

May 20, 1924.

F. H. VAN LOOZEN

ANTIFRICTION BEARING

Filed April 8, 1922

1,494,392

Inventor
Fred H. Van Loozen
By
Attorney

Patented May 20, 1924.

1,494,392

UNITED STATES PATENT OFFICE.

FRED H. VAN LOOZEN, OF LAKEWOOD, OHIO.

ANTIFRICTION BEARING.

Application filed April 8, 1922. Serial No. 550,645.

*To all whom it may concern:*

Be it known that I, FRED H. VAN LOOZEN, a citizen of the United States, residing at Lakewood, in the county of Cuyahoga and State of Ohio, have invented certain new and useful Improvements in Antifriction Bearings, of which the following is a specification.

My invention relates to improvements in anti-friction bearings, the present embodiment of the invention relating more particularly so that class or type commonly known as "roller thrust bearings" being particularly designed and adapted for use in connection with automobile differential gearings for reducing friction and wear between the parts. It should be understood, however, that my improvements may be readily embodied or incorporated in bearings of varying forms and types wherever an anti-friction bearing of the roller type may be useful or desirable.

The primary object of my invention is to provide a generally improved anti-friction bearing of the type indicated which will be exceedingly simple in construction, cheap of manufacture, and efficient in use.

A further and very important object is the provision of an improved roller carrying annulus or cage provided with improved means for permitting the inner ends of the roller bearings to float or shift into and to be held in different relative tangential positions in accordance with the relative direction of rotation of the adjacent thrust or friction plates or equivalent parts.

A still further and very important object is the provision of a roller carrying annulus or cage having an improved construction and arrangement of web and inner and outer roller retainer rings admirably adapted to be stamped from sheet metal and to be readily assembled for use.

In certain types of automobile differential gearings, particularly such as used in Ford cars and similar vehicles, it is customary practice to provide a thrust bearing for the differential gearing composed of two annular steel plates or washers with a brass or Babbitt metal annulus between them to reduce friction and wear. The reduction in friction is marked but the thrust bearing so made is relatively short lived and in many cases must be renewed when the vehicle has run say,—five thousand miles or less. In accordance with the present embodiment of my invention the roller carrying annulus or cage is interposed between or flanked by thrust or bearing plates having parallel extending friction bearing surfaces to cooperate with the corresponding friction or face sides of the roller bearings as distinguished from such bearings of the tapered type.

With the above mentioned and other ends in view, the invention consists in the novel construction, arrangement, and combination of parts, hereinafter described, illustrated in one of its embodiments in the accompanying drawings, and particularly pointed out in the appended claims.

Referring to the drawings, forming a part of this specification, Figure 1 is a fragmentary face view, partly in section, of a roller carrying annulus or cage, constructed in accordance with this invention, the full lines showing the relative positions of the floating or shiftable rollers when an adjacent part or plate is moved in one direction, and the dotted lines the opposite relative or shifted positions of the rollers when an adjacent part or plate is rotated in an opposite direction.

Figure 2:
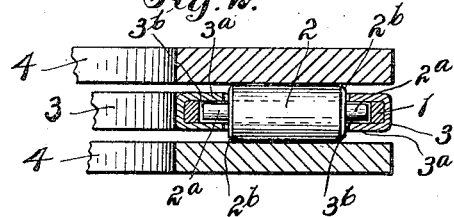

Fig. 2, an enlarged fragmentary sectional view of the same between two adjacent thrust or friction plates.

Figure 3:
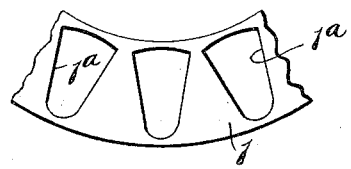

Fig. 3, a fragmentary plan or face view of the inner roller carrying annulus or web plate, the inner and outer roller retainer rings being detached, and illustrating in particular the tapered or cone-shaped roller receiving openings in the inner or web plate for permitting the inner ends of the rollers to float or shift into different tangential positions in accordance with the direction of rotation of the parts.

Similar numerals of reference designate like parts throughout all the figures of the drawings.

The improved roller carrying annulus or cage is preferably made up of a main annulus or web plate 1, provided with radially extending outwardly tapered or conical shaped roller receiving openings having radially or outwardly converging sides $1^a$, the sides $1^a$ diverging from each other toward the inner portions of the ring or web member 1 so that the inner ends of the rollers 2, will be adapted to take different tangential positions in accordance with the rotation of the adjacent part as indicated in Fig. 1 of the drawings and as hereinafter referred to. The sides 1ª of the roller receiving openings are adapted to act as stops to limit and hold the rollers 2 in their respective shifted tangential positions thereby permitting the rollers to roll with as little friction and drag as possible and as distinguished from the ordinary tapered type of roller.

As a means of permitting the free rotation of the rollers 2 and at the same time permitting the inner ends thereof to float and shift into their respective positions in accordance with the direction of rotation of the adjacent parts, the rollers 2 are preferably provided at their ends with trunnions 2ª, and as a means of retaining said rollers in a generally centralized position with respect to the web plate 1 and at the same time permitting such shifting motion of the rollers, inner and outer roller retainer rings 3, are provided of substantially U-shape or channel form in cross section, as shown most clearly in Fig. 2 of the drawings, the arms or flanges 3ª, of said rings extending over the marginal edges of the web plate 1, and toward each other in overlapping relation to the inner and outer ends of the openings carrying the rollers 2 and forming channel grooves or race-ways 3ᵇ (see Fig. 2), for loosely receiving the trunnions 2ª of the rollers. The inner and outer ends of the rollers 2 are preferably bevelled as at 2ᵇ, as shown in Fig. 2 of the drawings, and the roller retainer rings 3 are preferably of such thickness that the peripheries of the rollers 2 will project beyond the opposite face sides of the rings 3 and web plate 1, as shown most clearly in Fig. 2 of the drawings, so that the adjacent thrust or friction plates 4, will be engaged and supported solely by the intervening rollers 2.

Having thus described one of the embodiments of my invention, without having attempted to set forth all the forms in which it may be made, or all the modes of its use, what I claim and desire to secure by Letters Patent is,—

1. In an anti-friction bearing, a roller carrying annulus having outwardly radially converging roller receiving openings.

2. In an anti-friction roller bearing, an annular cage provided with rollers having floating inner ends adapted to take predetermined tangential positions.

3. A roller thrust bearing, comprising a roller carrying annulus provided with loosely mounted rollers having their inner ends adapted to shift into predetermined tangential positions, and thrust receiving plates on opposite sides of said annulus in engagement with said rollers adapted to automatically shift the inner ends of the latter in accordance with the direction of rotation.

4. A roller thrust bearing, comprising a roller carrying annulus provided with diametrically uniform rollers having their inner ends shiftable into predetermined positions, and thrust receiving plates on opposite sides of said annulus in engagement with said rollers adapted conjointly with the latter and said annulus to automatically shift the inner ends of said rollers in accordance with direction of rotation.

5. A roller thrust bearing, comprising a web plate provided with conical shaped radially extending openings, inner and outer rings of channel shape in cross section extending over the marginal edges of said web plate and openings forming trunnion receiving race-ways, and anti-friction rollers of uniform diameter provided with trunnions loosely mounted in said race-ways and adapted to engage in and be rotated by the sides of said openings in predetermined tangential positions.

6. A roller thrust bearing, comprising a web plate provided with conical shaped openings, inner and outer rings of U-shape in cross section having their sides extending over the edges of said web plate and conical shaped openings and conjointly therewith forming trunnion receiving race-ways, and anti-friction rollers of uniform diameter provided with trunnions loosely mounted in said race-ways and adapted to engage in and be rotated by said openings in predetermined tangential positions, the trunnions at the broader ends of said conical shaped openings having a limited floating connection in said race-ways.

In testimony whereof I have affixed my signature.

FRED H. VAN LOOZEN.